United States Patent
Jusko et al.

(10) Patent No.: US 10,382,462 B2
(45) Date of Patent: Aug. 13, 2019

(54) NETWORK SECURITY CLASSIFICATION

(71) Applicant: Cisco Technology, Inc., San Jose, CA (US)

(72) Inventors: Jan Jusko, Prague (CZ); Michal Sofka, Princeton, NJ (US)

(73) Assignee: Cisco Technology, Inc., San Jose, CA (US)

( * ) Notice: Subject to any disclaimer, the term of this patent is extended or adjusted under 35 U.S.C. 154(b) by 233 days.

(21) Appl. No.: 15/221,838

(22) Filed: Jul. 28, 2016

(65) Prior Publication Data
US 2018/0034838 A1 Feb. 1, 2018

(51) Int. Cl.
*H04L 29/06* (2006.01)
*G06N 7/00* (2006.01)
*G06N 20/00* (2019.01)

(52) U.S. Cl.
CPC ......... *H04L 63/1425* (2013.01); *G06N 7/005* (2013.01); *G06N 20/00* (2019.01); *H04L 63/1416* (2013.01); *H04L 63/1433* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 8,418,249 B1 * | 4/2013 | Nucci | G06F 21/552 706/20 |
| 9,621,431 B1 * | 4/2017 | Cardente | H04L 41/12 |
| 2015/0052090 A1 * | 2/2015 | Lin | G06N 7/005 706/12 |
| 2017/0103194 A1 * | 4/2017 | Wechsler | G06F 21/316 |

* cited by examiner

*Primary Examiner* — Andrew J Steinle
(74) *Attorney, Agent, or Firm* — Behmke Innovation Group LLC; James Behmke; Stephen D. LeBarron

(57) ABSTRACT

In one embodiment, a method includes obtaining a set of samples, each of the set of samples including sample values for each of a plurality of variables in a variable space. The method includes receiving, for each of an initial subset of the set of samples, a label for the sample as being either malicious or legitimate; identifying one or more boundaries in the variable space based on the labels and sample values for each of the initial subset; selecting an incremental subset of the unlabeled samples of the set of samples, wherein the incremental subset includes at least one unlabeled sample including sample values further from any of the one or more boundaries than an unlabeled sample that is not included in the incremental subset; and receiving, for each of the incremental subset, a label for the sample as being either malicious or legitimate.

20 Claims, 9 Drawing Sheets

300

| | C1 | C2 | C3 | C4 | C5 | C6 | C7 | C8 | C9 |
|---|---|---|---|---|---|---|---|---|---|
| S1 | 1 | 0 | 1 | 0 | 1 | 1 | 0 | 1 | 0 |
| S2 | 0 | 1 | 1 | 0 | 1 | 0 | 1 | 0 | 0 |
| S3 | 0 | 1 | 1 | 0 | 0 | 0 | 0 | 1 | 0 |
| S4 | 1 | 1 | 1 | 1 | 0 | 1 | 1 | 1 | 0 |
| S5 | 0 | 0 | 0 | 0 | 1 | 0 | 0 | 1 | 1 |
| S6 | 1 | 1 | 0 | 0 | 1 | 1 | 1 | 1 | 0 |
| S7 | 1 | 1 | 1 | 1 | 1 | 1 | 1 | 1 | 1 |
| S8 | 0 | 0 | 1 | 0 | 0 | 1 | 0 | 1 | 0 |
| S9 | 1 | 0 | 1 | 0 | 1 | 1 | 0 | 1 | 1 |

FIG. 3

NETWORK SECURITY CLASSIFICATION

TECHNICAL FIELD

The present disclosure relates generally to network security classification, and in particular, to systems, methods and apparatuses for classifying servers as malicious or legitimate.

BACKGROUND

The ongoing development, maintenance, and expansion of network systems involve an increasing number of servers communicating with an increasing number of client devices. This can present a challenge in securing the network system from malicious servers and large numbers of new malware types and instances.

Classifiers (and detectors based on such classifiers) can be designed based on collected samples with known and well-understood behaviors. However, training a classifier typically requires a large number of malware samples with sufficiently high variation in order to ensure high precision and recall. In most networking environments, although there may be a great number of malicious servers, the majority of the servers are legitimate. An overwhelming amount of servers, the imbalance of the behavioral data they create, and a tedious labeling process make training a classifier challenging.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 illustrates a bi-partite graph of communication patterns between servers and client devices in accordance with some implementations.

Figure 1:
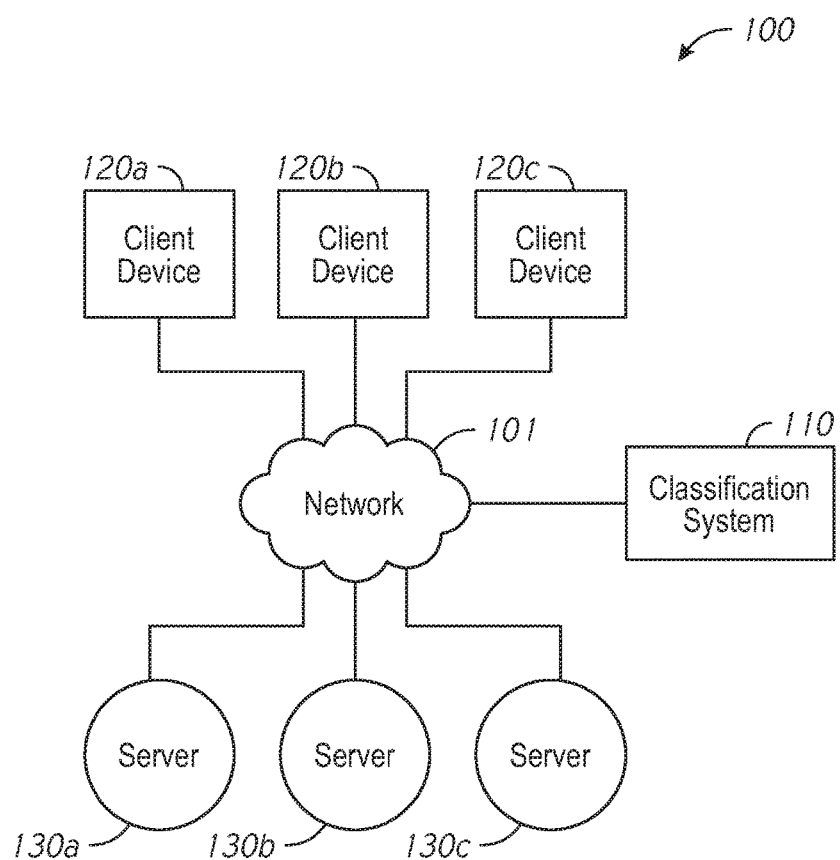
FIG. 1 is a diagram of networking environment in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for classifying a set of samples. For example, in some implementations, a method includes obtaining a set of samples, each of the set of samples including sample values for each of a plurality of variables in a variable space, receiving, for each of an initial subset of the set of samples, a label for the sample as being either malicious or legitimate, identifying one or more boundaries in the variable space based on the labels and sample values for each of the initial subset, selecting an incremental subset of the unlabeled samples of the set of samples, wherein the incremental subset includes at least one unlabeled sample including sample values further from any of the one or more boundaries than an unlabeled sample that is not included in the incremental subset, and receiving, for each of the incremental subset, a label for the sample as being either malicious or legitimate.

Example Embodiments

A number of challenges arise when applying supervised learning of a classifier to the domain of network security. Firstly, because of the large number of servers in a networking environment, e.g., the internet, only a small fraction of the servers can be labeled (e.g., classified with 100% probability by a source other than a classifier being trained) as part of a training set. Secondly, classifiers cannot generalize to fundamentally different behaviors to those in the training set which are known and labeled. Thirdly, a networking environment can have servers that exhibit an unknown number of malicious behaviors. Thus, not only would a classifier lack labeled examples for all malicious behaviors, a classifier may not know a priori how many such behaviors exist.

In various implementations, active learning can be used to address the first challenge of a large number of servers. When a networking environment includes a large amount of unlabeled data and labeling data is costly, an active learning algorithm can identify which unclassified samples should be labeled to maximize a classifier's performance.

Supervised classifiers can be trained for very specific behaviors or a general set of behaviors depending on the data set and feature representations. In either case, the generalization capability of the classifiers to find servers exhibiting malware behaviors beyond the training samples may be limited by the variability of the training set and the descriptive power of the variables of the training samples. For example, many classifiers do not help a security analyst find new classes of malicious behaviors, fundamentally different from those in the training set. However, some unsupervised methods can find various behaviors in the data.

When designing a classifier, it may be assumed the samples can be divided into several classes. Unfortunately, in the field of network security the number of classes present in the set of samples may not be known a priori. For example, a security analyst cannot assume he knows about all malicious behaviors in the network or even all the legitimate behaviors. However, regardless of the actual number of classes of malicious behavior, samples can be classified as either malicious or legitimate.

Described herein are systems and methods for training classifiers for behaviors present in the observed network traffic while assisting the analyst in effectively finding new, yet unlabeled, behaviors, taking into account the challenges described above.

FIG. 1 is a diagram of networking environment 100 in accordance with some implementations. The networking environment 100 includes a number of servers 130a-130c and a number of client devices 120a-120c coupled to (and able to communicate with each other over) a network 101. The network 101 includes any public or private LAN (local area network) and/or WAN (wide area network), such as an intranet, an extranet, a virtual private network, a cable or satellite network, and/or portions of or the entirety of the internet. Each client device 120a-120c and server 130a-130c is a device including a suitable combination of hardware, firmware, and software for performing one or more functions. In particular, each client device 120a-120c is a device that connects to some service over the network 101 and each server 130a-130c is a device that provides such services over the network 101.

Although FIG. 1 illustrates a networking environment 100 with only three servers 130a-130c and three client devices 120a-120c, it is to be appreciated that many networking environments includes a large number of servers (and/or client devices). For example, many networking environments include thousands or millions of servers.

The networking environment 100 further includes a classification system 110 that receives data regarding the servers 130a-130c based on their communication over the network 101 with the client devices 120a-120c. Based on this data, the classification system 110 generates a sample set, each of the samples corresponding to one of the servers 130a-130c and including respective sample values for each of a plurality of variables in a variable space. The plurality of variables can include, for example, an amount of network traffic transmitted and/or received by the server, a peak time of network traffic transmitted and/or received by the server, a number of client devices with which the server communicates, interarrival times of traffic received by the server, a geographic location of the server, or an IP address of the server. The plurality of variables can include whether traffic transmitted and/or received by the server is encrypted. The plurality of variables can include whether traffic transmitted and/or received by the server is HTTP and, if so, the length of the traffic, entropy of URLs, entropy of user agents, length of user agents, etc.

The classification system 110 can classify each of the samples as being either malicious or legitimate. Thus, the classification system 110 can classify each of the servers 130a-130c as being malicious or legitimate (or, more particularly, as exhibiting malicious behavior or legitimate behavior). Further, the classification system 100 can take proactive steps in response to classifying a server as malicious, such as blacklisting the server, blackholing traffic to or from the server, or reporting the server to a security administrator.

FIGS. 2A-2D illustrate an example of an active learning algorithm applied to a set of samples. Active learning is a type of semi-supervised machine learning wherein the classification system iteratively selects samples to be labeled by an oracle (e.g., a human expert, a security analyst, or any other source other than the classification system). The samples are selected such that training requires fewer samples to be labeled to achieve high accuracy levels. Thus, active learning increases the learning speed of the classification system and decreases labeling cost.

The selection of samples for labeling in active learning (referred to herein as an incremental subset) is governed by a query strategy. In some implementations, the query strategy is an exploitation strategy and the incremental subset includes an exploitation subset. Exploitation strategies include uncertainty reduction, expected-error minimization, and version space reduction. For example, at least a portion of the exploitation subset of samples can be selected as the samples having sample values closest to an identified boundary.

In some implementations, the query strategy is an exploration strategy and the incremental subset includes an exploration subset. Threat propagation is a method that builds a graph of actors and finds actor communities based on their activities and known community memberships. In the context of network security, threat propagation returns a probability of a server being malicious given knowledge of some malicious and legitimate servers. Accordingly, in some embodiments, at least a portion of the exploration subset of samples can be selected based on threat propagation. In some embodiments, at least a portion of the exploration subset can be selected based on a Fisher's exact test, knowledge from sandbox analysis, or other methods.

In some embodiments, at least a portion of the exploration subset of samples can be selected randomly. However, in the context of network security, the number of legitimate servers far exceeds the malicious servers. Thus, although the classification system can use a strictly random query strategy in some implementations, it is expected to be less effective than other exploration strategies.

Figure 2A:
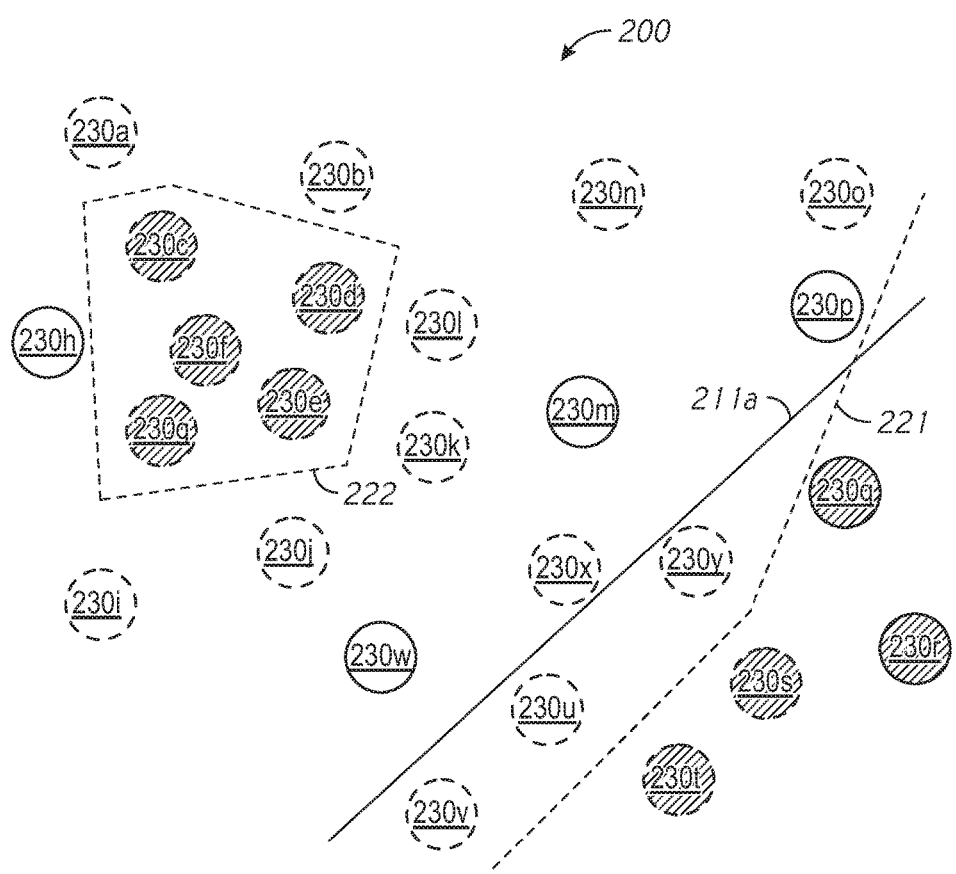
FIGS. 2A-2D illustrates a graphical representation of a variable space in two dimensions in accordance with some implementations.

FIG. 2A illustrates a graphical representation of a variable space 200 in two dimensions. Plotted on the graphical representation of the variable space 200 is a number of sample points 230a-230y. Each of the sample points 230a-230y corresponds to a sample (and, thus, a server) and is located at a position on the graphical representation of the variable space 200 corresponding to the respective sample values for two variables of the sample. Each of the samples is either labeled (as indicated by a sample point with a solid circle) or unlabeled (as indicated by sample point with a dashed circle). Further, each of the samples is either malicious (as indicated by a sample point with a gray circle) or legitimate (as indicated by a sample point with a white circle). Thus, a sample corresponding to sample point 230a is unlabeled and legitimate, a sample corresponding to sample point 230c is unlabeled and malicious, a sample corresponding to sample point 230h is labeled and legitimate, and a sample corresponding to sample point 230q is labeled and malicious. In FIG. 2A, an initial set of samples (corresponding to the six sample points 230h, 230m, 230p, 230q, 230r, and 230w) are labeled. The rest of the samples are unlabeled. In some embodiments, the initial set of samples can be labeled (e.g., classified with 100% probability by a source other than the classifier being trained) as an initial step in training a classifier.

FIG. 2A illustrates a first true border 221 and a second true border 222 within the variable space 200. Each true border 221, 222 is a curve separating sample points corresponding to malicious samples from sample points corresponding to legitimate samples. In various implementations, the true border can be a plane in a three-dimensional variable space or, in general, a hyperplane. FIG. 2A also illustrates a first identified border 211a generated by a classifier in response to receiving the labels of the initial sample set. As can be seen in FIG. 2A, the first identified border 211a inaccurately reflects the first true border 221. For example, using the first identified border 211a, the classifier would classify the sample corresponding to sample point 230v as malicious despite it being a legitimate sample. Further, because the classifier has not identified a border corresponding to the second true border 222, the classifier would classify the sample corresponding to sample point 230c as being legitimate despite it being a malicious sample.

Figure 2B:
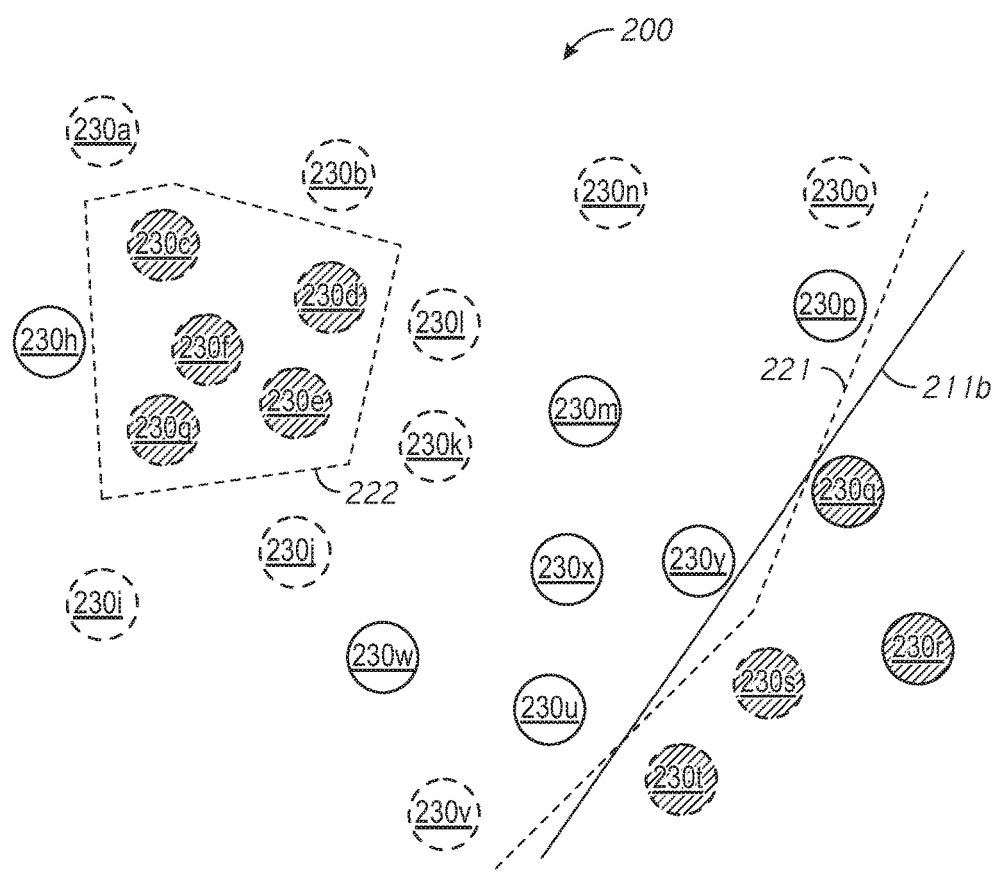

FIG. 2B illustrates the variable space 200 of FIG. 2A with additional labeled samples. In particular, in FIG. 2B, each of an exploitation set of samples (corresponding to sample points 230u, 230x, and 230y) is labeled. The exploitation set of samples can be selected by selecting samples corresponding to sample points close to the first identified border 211a. In some embodiments, the exploitation set of samples can be labeled as an iterative step in training the classifier.

Based on the labels of the exploitation set of samples, the first identified border 211b has moved, more accurately reflecting the first true border 221. For example, using the updated first identified border 211b, the classifier would correctly classify the sample corresponding to sample point 230v as legitimate. However, because the classifier has still not identified a border corresponding to the second true border 222, the classifier would classify the sample corresponding to sample point 230c as being legitimate despite it being a malicious sample.

Figure 2C:
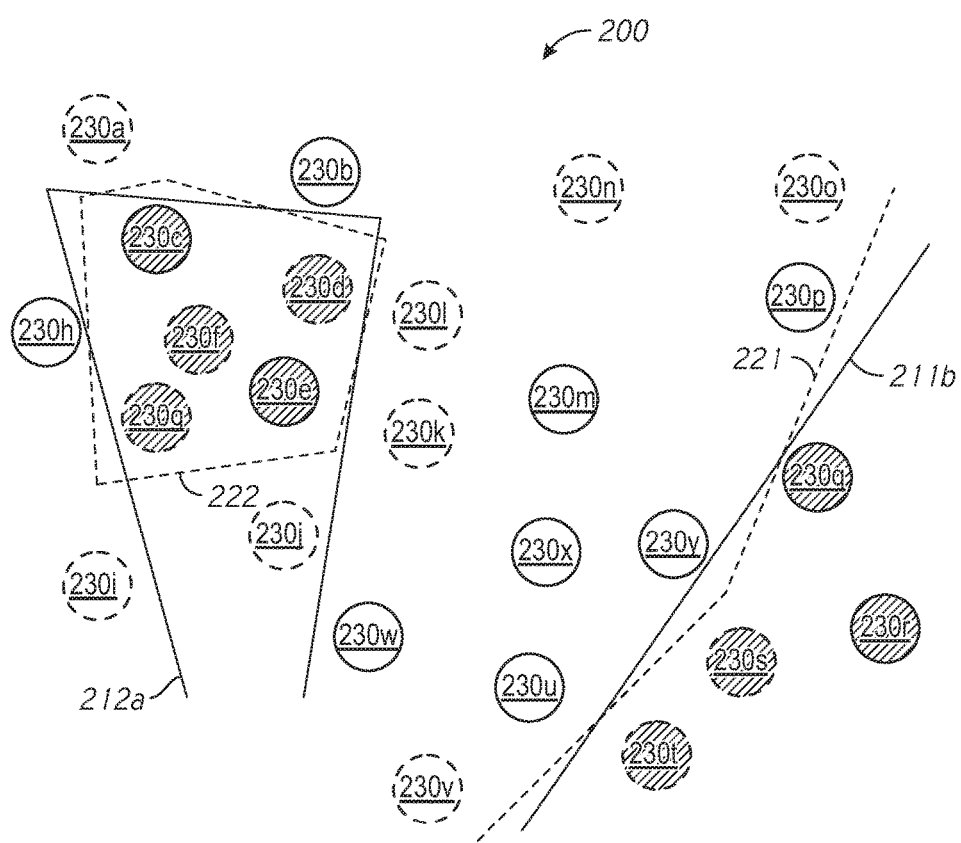

FIG. 2C illustrates the variable space 200 of FIG. 2B with additional labeled samples. In particular, in FIG. 2C, each of an exploration set of samples (corresponding to sample points 230b, 230c, and 230e) is labeled. The exploration set of samples can be selected by selecting samples corresponding to sample points not necessarily close to the first identified border 211b. In some embodiments, the exploration set of samples can be selected using an external prioritization scheme in which the exploration set of samples are dissimilar from samples labeled as malicious in the representation considered by the classifier, but are similar in another representation (e.g., with which client devices they communicate in the case of threat propagation). In some embodiments, the exploration set of samples can be labeled as an iterative step in training the classifier.

FIG. 2C also illustrates a second identified border 212a generated by the classifier in response to receiving the labels of the exploration set of samples. As can be seen in FIG. 2C, the second identified border 212a inaccurately reflects the second true border 222. For example, using the second identified border 212a, the classifier would classify the sample corresponding to sample point 230j as malicious despite it being a legitimate sample. However, the classifier would accurately classify the samples corresponding to sample points 230d, 230f, and 230g as being malicious.

Thus, in FIG. 2C, the classifier has identified a new border, the second identified border 212a based on the labels of the exploration set of sample. In some implementations, different borders corresponds to different sub-classes of malicious samples. Thus, the classifier can identify multiple classes of both malicious and legitimate behavior.

Figure 2D:
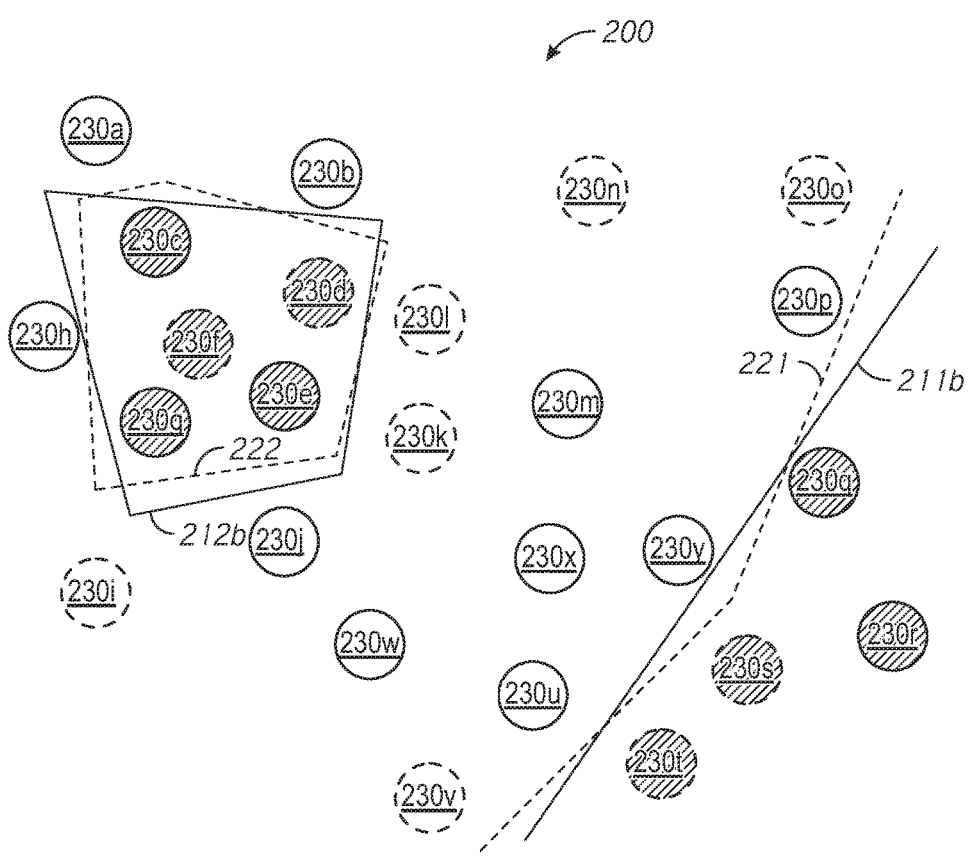

FIG. 2D illustrates the variable space 200 of FIG. 2C with additional labeled samples. In particular, in FIG. 2D, each of a second exploitation set of samples (corresponding to sample points 230a, 230g and 230j) is labeled. The second exploitation set of samples can be selected by selecting samples corresponding to sample points close to the second identified border 212a (and/or the first identified border 211b). In some embodiments, the second exploitation set of samples can be labeled as an iterative step in training the classifier.

Based on the labels of the second exploitation set of samples, the second identified border 212b has moved, more accurately reflecting the second true border 222. Using the updated second identified border 212b and the updated first identified border 211b, the classifier would accurately classify all of the samples.

Thus, as more samples are identified as being part of exploration and exploitation sets of samples and as each of the samples are labeled, the classifier becomes more accurate, both at locations near identified borders and by identifying new borders which may be far from identified borders.

FIG. 3 illustrates a bi-partite representation 300 of communication patterns between servers and client devices in accordance with some implementations. In particular, the bi-partite representation 300 includes a number of rows corresponding to servers and a number of columns corresponding to client devices. If a particular server has communicated with a particular client (e.g., within a defined time period), the intersection of the corresponding row and column is marked with a '1'; otherwise, the intersection is marked with a '0'.

The bi-partite representation 300 can be used to identify servers having corresponding samples to be included in an exploration set of samples. For two servers, a similarity metric can be defined using the information represented by the bi-partite representation 300.

Figure 4:
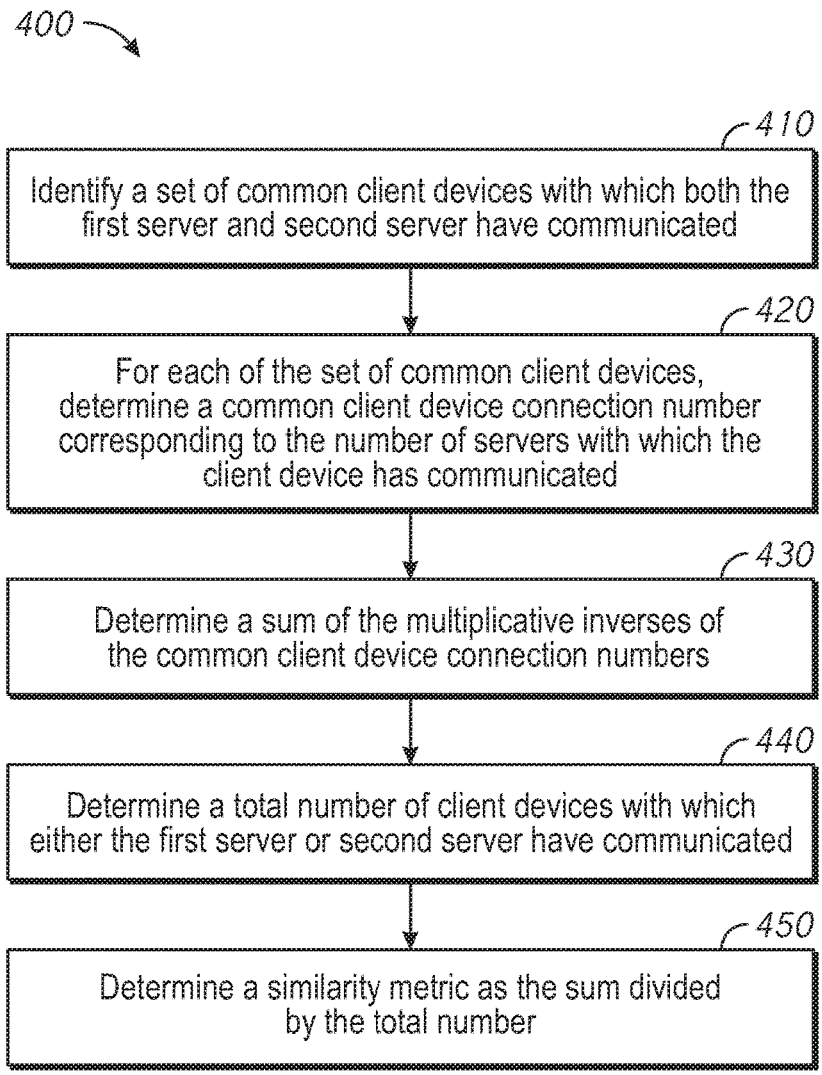
FIG. 4 is a flowchart representation of a method of determining a similarity metric between a first server and a second server in accordance with some implementations.

FIG. 4 is a flowchart representation of a method 400 of determining a similarity metric between a first server and a second server in accordance with some implementations. In some implementations (and as detailed below as an example), the method 400 is performed by a classification system (or a portion thereof), such as the classification system 110 of FIG. 1. In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, the method 400 includes dividing a weighted sum of client devices with which both the first server and the second server have communicated by a total number of client devices with which either the first server or the second server have communicated.

The method 400 begins, at block 410, with the classification system identifying a set of common client devices with which both the first server and the second server have communicated. For example, to determine the similarly metric between server S1 and server S2 using the bi-partite representation 300 of FIG. 3, the classification system identifies a set of common client devices including client device C3 and client device C5.

At block 420, the classification system determines, for each of the set of common client devices, a common client device connection number corresponding to the number of servers with which the client device has communicated. Continuing the example to determine the similarity metric between server S1 and server S2, the classification system determines, for client device C3, a common client device connection number of seven as the number of servers with which the client device C3 has communicated and, for client device C5, a common client device connection number of six as the number of servers with which the client device C5 has communicated.

At block 430, the classification system determines a sum of the multiplicative inverses of the common client device connection numbers. Thus, client devices that connect to only a few servers have a higher weight in the similarity metric than client devices that connect to large amount of servers. This follows the intuition that a client device that connects to many servers provides less information regarding a relationship between those servers. Continuing the example to determine the similarity metric between server S1 and server S2, the classification system determines the sum as $1/7+1/6=13/42\approx0.31$.

At block 440, the classification system determines the total number of client devices with which either the first server or second server have communicated. Continuing the example to determine the similarity metric between server S1 and server S2, the classification system determines the total number as seven because, together, server S1 and server S2 have communicated with client device C1 (just server S1), client device C2 (just server S2), client device C3 (both server S1 and server S2), client device C5 (both server S1 and server S2), client device C6 (just server S1), client device C7 (just server S1), and client device C8 (just server S1).

At block 450, the classification system determines the similarity metric as the sum of the multiplicative inverses of the common client device connection numbers (determined in block 430) divided by the total number of client devices with which the first server and second server have communicated (determined in block 440). It is to be appreciated that the common client connection number affects only the numerator, preventing the case of a high similarity metric resulting from two servers with which only one very active client device communicates. Continuing the example to determine the similarity metric between server S1 and server S2, the classification system determines the similarity metric as $13/42$ divided by 7, or $13/294\approx\mathbf{0.044}$.

As another example, to determine the similarly metric between server S1 and server S9 using the bi-partite representation 300 of FIG. 3, the classification system identifies (in block 410) a set of common client devices including client device C1, client device C3, client device C5, client device C6, and client device C8. The classification system determines (in block 420) common client device connection numbers of five, seven, six, six, and eight. The classification system determines (in block 430) a sum of $1/5+1/7+1/6+1/6+1/8=673/840\approx0.80$. The classification system determines (in block 440) a total number of six. The classification system determines (in block 450) a similarly metric of $673/5040\approx0.13$. Thus, server S1 is more similar to server S9 than server S2.

Figure 5:
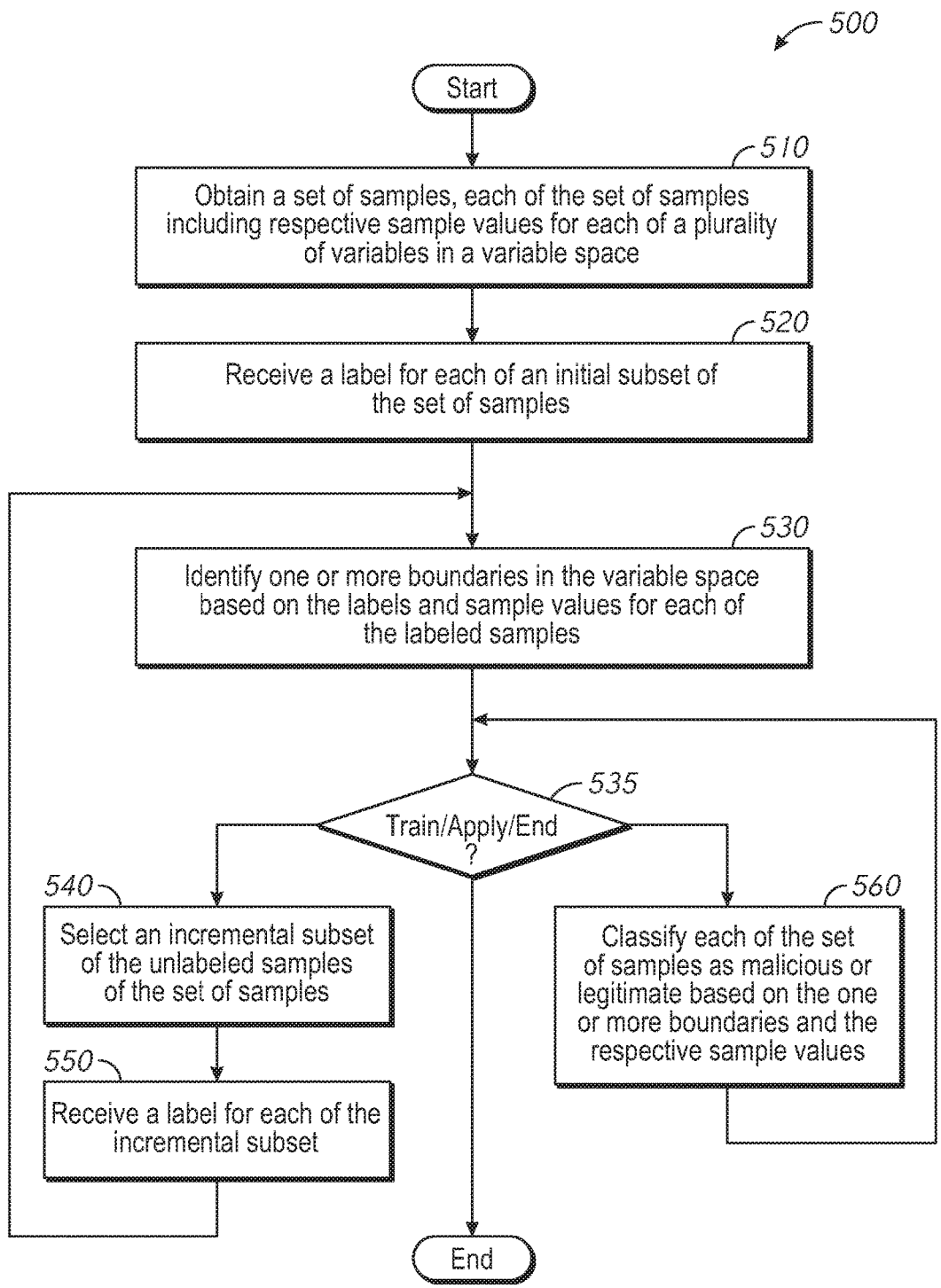
FIG. 5 is a flowchart representation of a method of classifying a set of samples in accordance with some implementations.

FIG. 5 is a flowchart representation of a method 500 of classifying a set of samples in accordance with some implementations. In some implementations (and as detailed below as an example), the method 500 is performed by a classification system (or a portion thereof), such as the classification system 110 of FIG. 1. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes iteratively training a classifier using received labels for selected samples and classifying a set of samples using the trained classifier.

The method 500 begins, at block 510, with the classification system obtaining a set of samples. Each of the set of samples includes respective sample values for each of a plurality of variables in a variable space. In various implementations, each of the samples corresponds to a server in a network and the sample values correspond to data regarding the server. The plurality of variables can include, for example, an amount of network traffic transmitted and/or received by the server, a peak time of network traffic transmitted and/or received by the server, a number of client devices with which the server communicates, interarrival times of traffic received by the server, a geographic location of the server, or an IP address of the server. The plurality of variables can include whether traffic transmitted and/or received by the server is encrypted. The plurality of variables can include whether traffic transmitted and/or received by the server is HTTP and, if so, the length of the traffic, entropy of URLs, entropy of user agents, length of user agents, etc.

In some embodiments, the classification system generates the set of samples by inspecting traffic over a network. In some embodiments, the classification system receives the set of samples.

At block 520, the classification system receives a label for each of an initial subset of the set of samples. In various implementations, the size of the initial subset of samples can be any number of samples. For example, in some implementations, the size of the initial subset of samples can be less than 1.0%, less than 0.1%, or less than 0.01% of the size of set of samples. In various implementations, the classification system receives, for each of the initial subset of the set of samples, a label indicating that the sample is malicious or legitimate.

At block 530, the classification system identifies one or more boundaries in the variable space based on the labels and sample values for each of the labeled samples. With no iterations completed, the labeled samples include the initial subset of the set of samples. The boundaries are determined such that, for each of the boundaries, samples having sample values on one side of the boundary are labeled as malicious and samples having sample values on the other side of the boundary are labeled as legitimate. The boundaries form the basis of a classifier which can be applied (as described further below) to the samples to classify the samples as malicious or legitimate. In various implementations, the classifier is a random forest classifier that can train multiple tress for various malicious sub-classes. In other implementations, other classifiers can be used.

At block 535, the classification system decides to further train the classifier, apply the classifier to the set of samples, or end the method 500. If the classification system decides to further train the classifier, the method 500 continues to block 540. If the classification system decides to apply the classifier, the method continues to block 560. If the classification system decides to end the method 500, the method 500 ends.

At block 540, the classification system selects an incremental subset of the unlabeled samples of the set of samples. Accordingly, with zero iterations completed, the classification system selects unlabeled samples from the set of samples which are not in the initial subset. In various implementations, the incremental subset can include an exploitation subset of samples having sample values close to identified boundaries and/or an exploration subset of samples having sample values far from identified boundaries.

The classification system can use active learning, a type of semi-supervised machine learning wherein the classification system iteratively selects samples to be labeled by an oracle (e.g., a human expert, a security analyst, or any other source other than the classification system). The incremental subset is selected such that training requires fewer samples to be labeled to achieve high accuracy levels. Thus, active learning increases the learning speed of the classification system and decreases labeling cost.

The selection of samples for labeling in active learning (e.g., the incremental subset) is governed by a query strategy. In some implementations, the query strategy is an exploitation strategy and the incremental subset includes an exploitation subset. Exploitation strategies include uncertainty reduction, expected-error minimization, and version space reduction. Accordingly, in some embodiments, at least a portion of the exploitation subset of samples can be selected to minimize uncertainty of the location of the identified boundaries. For example, at least a portion of the exploitation subset of samples can be selected as the samples having sample values closest to an identified boundary.

In some implementations, the query strategy is an exploration strategy and the incremental subset includes an exploration subset. Threat propagation is a method that builds a graph of actors and finds actor communities based on their activities and known community memberships. In the context of network security, threat propagation returns a probability of a server being malicious given knowledge of some malicious and legitimate servers. Accordingly, in some embodiments, at least a portion of the exploration subset of samples can be selected based on threat propagation. For example, at least a portion of the exploration subset of samples can be selected based on the similarity of a server corresponding to the sample to a server corresponding to a sample labeled as malicious. As described above with respect to FIGS. 3 and 4, a similarity metric between two servers can be determined. Thus, at least a portion of the exploration subset of samples can be selected based on a similarity metric between a server corresponding to the sample and a server corresponding to a sample labeled as malicious. Although, in some embodiments, the similarity metric is determined based on threat propagation, in other embodiments, the similarity metric is determined based on a Fisher's exact test, knowledge from sandbox analysis, or other methods.

In some embodiments, at least a portion of the exploration subset of samples can be selected randomly. However, in the context of network security, the number of legitimate servers far exceeds the malicious servers. Thus, although the classification system can use a strictly random query strategy in some implementations, it is expected to be less effective than other exploration strategies.

In various implementations, the classification system uses both exploitation and exploration strategies. In some embodiments, the classification system selects an exploitation subset of samples as the incremental subset of samples for odd iterations and an exploration subset of samples as the incremental subset of samples for even iterations. In some embodiments, the classification system selects, for each iteration, an exploitation subset of samples and an exploration subset of samples. For example, the classification system can select the exploitation subset of samples as a pre-specified fraction of the incremental subset of samples and the exploration subset of samples as the remaining samples of the incremental subset of samples. In some embodiments, the classification system selects an exploitation subset of samples as the incremental subset of samples for a number of iterations until the classifier reaches a steady-state (e.g., the identified boundaries change less than a threshold amount between iterations) and then, for a number of iterations, selects an exploration subset of samples as the incremental subset of samples.

When the incremental subset includes an exploration subset, the incremental subset includes at least one unlabeled sample including sample values further from any of the identified boundaries than an unlabeled sample that is not included in the incremental subset.

At block 550, the classification system receives a label for each of the incremental subset. In various implementations, the classification system receives, for each of the incremental subset, a label indicating that the sample is malicious or legitimate.

From block 550, the method returns to block 530 where the classification system identifies one or more boundaries in the variable space based on the labels and sample values for each of the labeled samples. With one iteration completed, the labeled samples include the initial subset and a first incremental subset. Thus, the boundaries identified in block 530 after one or more iterations are more accurate than the boundaries after zero iterations. Further, in some embodiments, the boundaries identified in block 530 after one or more iterations can include boundaries that were not identified after zero iterations.

At block 560, the classification system applies the trained classifier and classifies each of the set of samples (or, at least each of the unlabeled samples of the set of samples) as malicious or legitimate based on the one or more boundaries identified in block 530 and the respective sample values of the set of samples. The boundaries are applied in such a way that, for each of the boundaries, samples having sample values on one side of the boundary are classified as malicious and samples having sample values on the other side of the boundary are classified as legitimate.

In various implementations, the method 500 can be repeated when set of samples is changed, e.g., when new samples are added or new data is available for servers corresponding to the samples.

Figure 6:
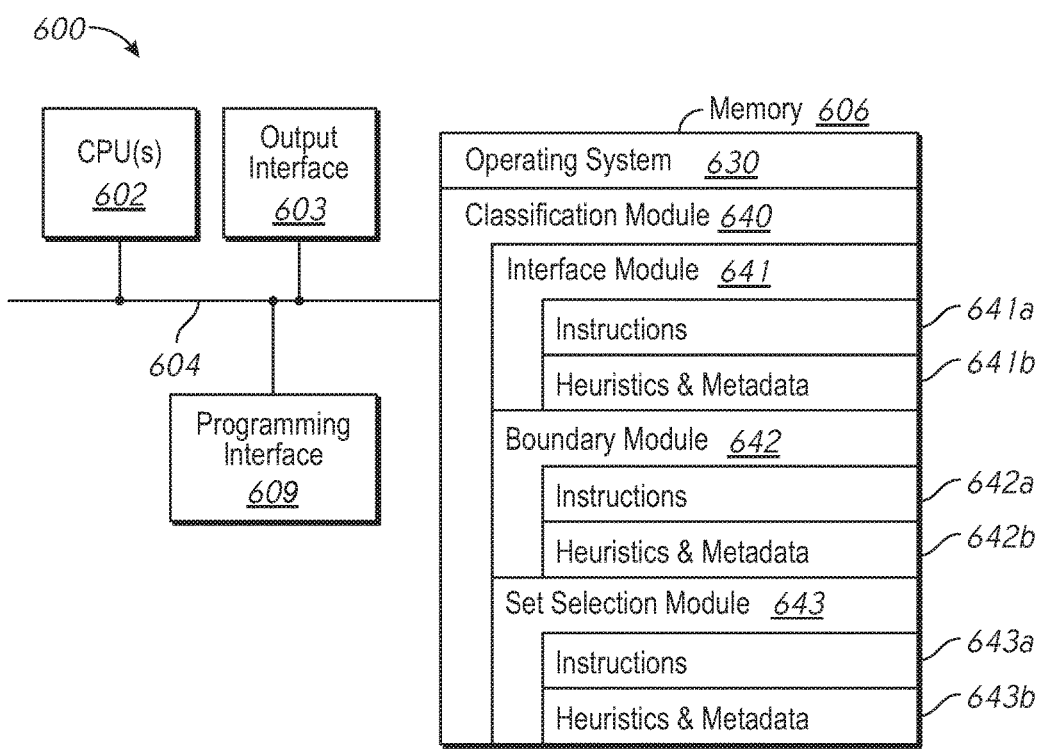
FIG. 6 is a block diagram of a computing device in accordance with some implementations.

FIG. 6 is a block diagram of a computing device 600 in accordance with some implementations. In some implementations, the computing device 600 corresponds to the classification system 110 of FIG. 1 and performs one or more of the functionalities described above with respect to the classification system 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPU's) 602 (e.g., processors), one or more input/output interfaces 603 (e.g., a network interface and/or a sensor interface), a memory 606, a programming interface 609, and one or more communication buses 604 for interconnecting these and various other components.

In some implementations, the communication buses 604 include circuitry that interconnects and controls communications between system components. The memory 606 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some implementations, the memory 606 or the non-transitory computer readable storage medium of the memory 606 stores the following programs, modules and data structures, or a subset thereof including an optional operating system 630 and classification module 640. In some implementations, one or more instructions are included in a combination of logic and non-transitory memory. The operating system 630 includes procedures for handling various basic system services and for performing hardware dependent tasks. In some implementations, the classification module 640 is configured to classify each of a set of samples. To that end, the classification module 640 includes an interface module 641, a boundary module 642, and a set selection module 643.

In some implementations, the interface module 641 is configured to obtain a set of samples, each of the set of samples including respective sample values for each of a plurality of variables in a variable space. To that end, the interface module 641 includes a set of instructions 641a and heuristics and metadata 641b. In some implementations, the interface module is further configured to receive a label for each of an initial subset of the set of samples. In some implementations, the boundary module 642 is configured to identify one or more boundaries in the variable space based on the labels and sample values for each of the initial subset. To that end, the boundary module 642 includes a set of instructions 642a and heuristics and metadata 642b. In some implementations, the set selection module 643 is configured to select an incremental subset of the unlabeled samples of the set of samples. In some embodiments, the incremental subset includes at least one unlabeled sample including sample values further from any of the one or more boundaries than an unlabeled sample that is not included in the incremental subset. To that end, the set selection module 643 includes a set of instructions 643a and heuristics and metadata 643b. In some embodiments, the interface module 641 is further configured to receive a label for each of the incremental subset.

Although the classification module 640, the interface module 641, the boundary module 642, and the set selection module 643 are illustrated as residing on a single computing device 600, it should be understood that in other embodiments, any combination of the classification module 640, the interface module 641, the boundary module 642, and the set selection module 643 reside in separate computing devices in various implementations. For example, in some implementations each of the classification module 640, the interface module 641, the boundary module 642, and the set selection module 643 reside on a separate computing device or in the cloud.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:
1. A method comprising:
obtaining a set of samples, the set of samples including sample values for each of a plurality of variables in a variable space;

training a classifier by:
receiving, for each of an initial subset of the set of samples, a label for the sample as being either malicious or legitimate,
identifying one or more boundaries in the variable space based on the labels and sample values for each of the initial subset,
selecting an incremental subset of the unlabeled samples of the set of samples, wherein the incremental subset includes at least one unlabeled sample including sample values further from any of the one or more boundaries than an unlabeled sample that is not included in the incremental subset,
receiving, for each of the incremental subset, a label for the sample as being either malicious or legitimate, and
generating one or more updated boundaries in the variable space based on the labels and sample values for each of the incremental subset; and
applying the classifier to a subset of unlabeled samples as malicious or legitimate based on the one or more updated boundaries in the variable space and the sample values for the initial subset and the incremental subset.

2. The method of claim 1, wherein obtaining the set of samples includes generating the set of samples based on received traffic data regarding traffic over a network including a plurality of servers.

3. The method of claim 1, wherein each of the set of samples corresponds to a server in a network and the sample values correspond to data regarding the server.

4. The method of claim 3, wherein selecting the incremental subset is based on data regarding communication of client devices with the servers.

5. The method of claim 3, wherein selecting the incremental subset is based on data regarding which servers communicate with client devices that communicate with servers corresponding to samples labeled as malicious.

6. The method of claim 3, wherein selecting the incremental subset is based on determining respective similarity metrics between a server corresponding to a sample labeled as malicious and respective servers corresponding to unlabeled samples.

7. The method of claim 6, wherein determining one of the respective similarity metrics includes:
identifying a set of common client devices with which both the server corresponding to a sample labeled as malicious and one of the respective servers corresponding to an unlabeled sample have communicated;
determining, for each of the set of common client devices, a common client device connection number corresponding to the number of servers with which the client device has communicated;
determining a sum of the multiplicative inverses of the common client device connection numbers;
determining a total number of client devices with which either the server corresponding to a sample labeled as malicious or the one of the respective servers corresponding to an unlabeled sample have communicated; and
determining the one of the respective similarity metrics as the sum divided by the total number.

8. The method of claim 1, wherein the incremental subset includes an exploration subset selected using an exploration query strategy.

9. The method of claim 8, wherein the incremental subset further includes an exploitation subset selected using an exploitation query strategy.

10. The method of claim 9, wherein the exploitation subset includes unlabeled samples closest to the one or more boundaries.

11. The method of claim 1, further comprising:
determining whether to further train the classifier or to apply the classifier to the subset of unlabeled samples; and
in response determining to further train the classifier:
selecting a second incremental subset of the unlabeled samples of the set of samples, wherein the second incremental subset includes at least one unlabeled sample including sample values further from any one of the one or more boundaries than the unlabeled sample that is not included in the second incremental subset,
receiving, for each of the second incremental subsets, a label for the sample as being either malicious or legitimate, and
generating a second set of one or more updated boundaries in the variable space based on the labels and sample values for each of the second incremental.

12. The method of claim 1, wherein the one or more updated boundaries includes a greater number of boundaries than the one or more boundaries.

13. The method of claim 12, wherein the updated boundaries correspond to multiple classes of malicious samples.

14. A system comprising:
one or more processors; and
a non-transitory memory comprising instructions that when executed cause the one or more processors to perform operations comprising:
obtaining a set of samples, the set of samples including sample values for each of a plurality of variables in a variable space;
training a classifier by:
receiving, for each of an initial subset of the set of samples, a label for the sample as being either malicious or legitimate,
identifying one or more boundaries in the variable space based on the labels and sample values for each of the initial subset,
selecting an incremental subset of the unlabeled samples of the set of samples, wherein the incremental subset includes at least one unlabeled sample including sample values further from any of the one or more boundaries than an unlabeled sample that is not included in the incremental subset,
receiving, for each of the incremental subset, a label for the sample as being either malicious or legitimate, and
generating one or more updated boundaries in the variable space based on the labels and sample values for each of the incremental subset; and
applying the classifier to a subset of unlabeled samples as malicious or legitimate based on the one or more updated boundaries in the variable space and the sample vales for the initial subset and the incremental subset.

15. The system of claim 14, wherein each of the set of samples corresponds to a server in a network and the sample values corresponding to data regarding the server.

16. The system of claim 15, wherein selecting the incremental subset is based on determining respective similarity metrics between a server corresponding to a sample labeled as malicious and respective servers corresponding to unlabeled samples.

17. The system of claim 16, wherein determining one of the respective similarity metrics includes:
   identifying a set of common client devices with which both the server corresponding to a sample labeled as malicious and one of the respective servers corresponding to an unlabeled sample have communicated;
   determining, for each of the set of common client devices, a common client device connection number corresponding to the number of servers with which the client device has communicated;
   determining a sum of the multiplicative inverses of the common client device connection numbers;
   determining a total number of client devices with which either the server corresponding to a sample labeled as malicious or the one of the respective servers corresponding to an unlabeled sample have communicated; and
   determining the one of the respective similarity metrics as the sum divided by the total number.

18. The system of claim 14, wherein the incremental subset includes an exploration subset selected using an exploration query strategy.

19. The system of claim 18, wherein the incremental subset further includes an exploitation subset selected using an exploitation query strategy.

20. A method comprising:
   obtaining a set of samples, the set of samples corresponding to a server in a network and including sample values for each of a plurality of variables in a variable space;
   training a classifier by:
      receiving, for each of an initial subset of the set of samples, a label for the sample as being either malicious or legitimate,
      identifying one or more boundaries in the variable space based on the labels and sample values for each of the initial subset,
      selecting an incremental subset of the unlabeled samples of the set of samples, wherein the incremental subset includes at least one unlabeled sample including sample values further from any of the one or more boundaries than an unlabeled sample that is not included in the incremental subset,
      receiving, for each of the incremental subset, a label for the sample as being either malicious or legitimate, and
      generating one or more updated boundaries in the variable space based on the received labels and sample values for each of the incremental subset; and
   applying the classifier to a subset of unlabeled samples as malicious or legitimate based on the one or more updated boundaries in the variable space and the sample values for the initial subset and the incremental subset.

* * * * *